(12) United States Patent
Leder et al.

(10) Patent No.: US 12,620,391 B2
(45) Date of Patent: May 5, 2026

(54) METHOD, DEVICE AND COMPUTER PROGRAM PRODUCT FOR CONTROLLING A FUNCTIONAL UNIT OF A VEHICLE

(71) Applicant: MERCEDES-BENZ GROUP AG, Stuttgart (DE)

(72) Inventors: Markus Leder, Stuttgart (DE); Sabrina Lamberth-Cocca, Wildberg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 133 days.

(21) Appl. No.: 18/702,550

(22) PCT Filed: Oct. 7, 2022

(86) PCT No.: PCT/EP2022/077905
§ 371 (c)(1),
(2) Date: Apr. 18, 2024

(87) PCT Pub. No.: WO2023/066682
PCT Pub. Date: Apr. 27, 2023

(65) Prior Publication Data
US 2025/0246184 A1     Jul. 31, 2025

(30) Foreign Application Priority Data
Oct. 19, 2021     (DE) ..................... 10 2021 005 206.4

(51) Int. Cl.
*G10L 15/10*     (2006.01)
*G10L 15/22*     (2006.01)
G10L 15/08     (2006.01)

(52) U.S. Cl.
CPC .............. *G10L 15/10* (2013.01); *G10L 15/22* (2013.01); *G10L 2015/088* (2013.01)

(58) Field of Classification Search
USPC ............... 704/239, 246, 247, 251, 252, 275
See application file for complete search history.

(56) References Cited

U.S. PATENT DOCUMENTS

2010/0324900 A1     12/2010   Faifkov et al.
2015/0302848 A1*    10/2015   Kurata .................... G10L 25/51
                                                          704/254
(Continued)

FOREIGN PATENT DOCUMENTS

DE       202017106606 U1     2/2018
EP          3078021 B1     12/2018
(Continued)

OTHER PUBLICATIONS

International Search Report and Written Opinion mailed Dec. 23, 2022 in related/corresponding International Application No. PCT/EP2022/077905.
(Continued)

*Primary Examiner* — Leonard Saint-Cyr
(74) *Attorney, Agent, or Firm* — PATENT PORTFOLIO BUILDERS PLLC

(57) ABSTRACT

Multi-part keywords for activating a speech operating system are recognized by receiving a phonetic sequence and checking the phonetic sequence for the presence of a first part of the keyword. Only if the first part is recognized, the phonetic sequence is checked for the presence of a second part of the keyword. The speech operating system for carrying out an action is activated only if the second part is recognized.

11 Claims, 2 Drawing Sheets

(56)                    References Cited

U.S. PATENT DOCUMENTS

Figure 1:
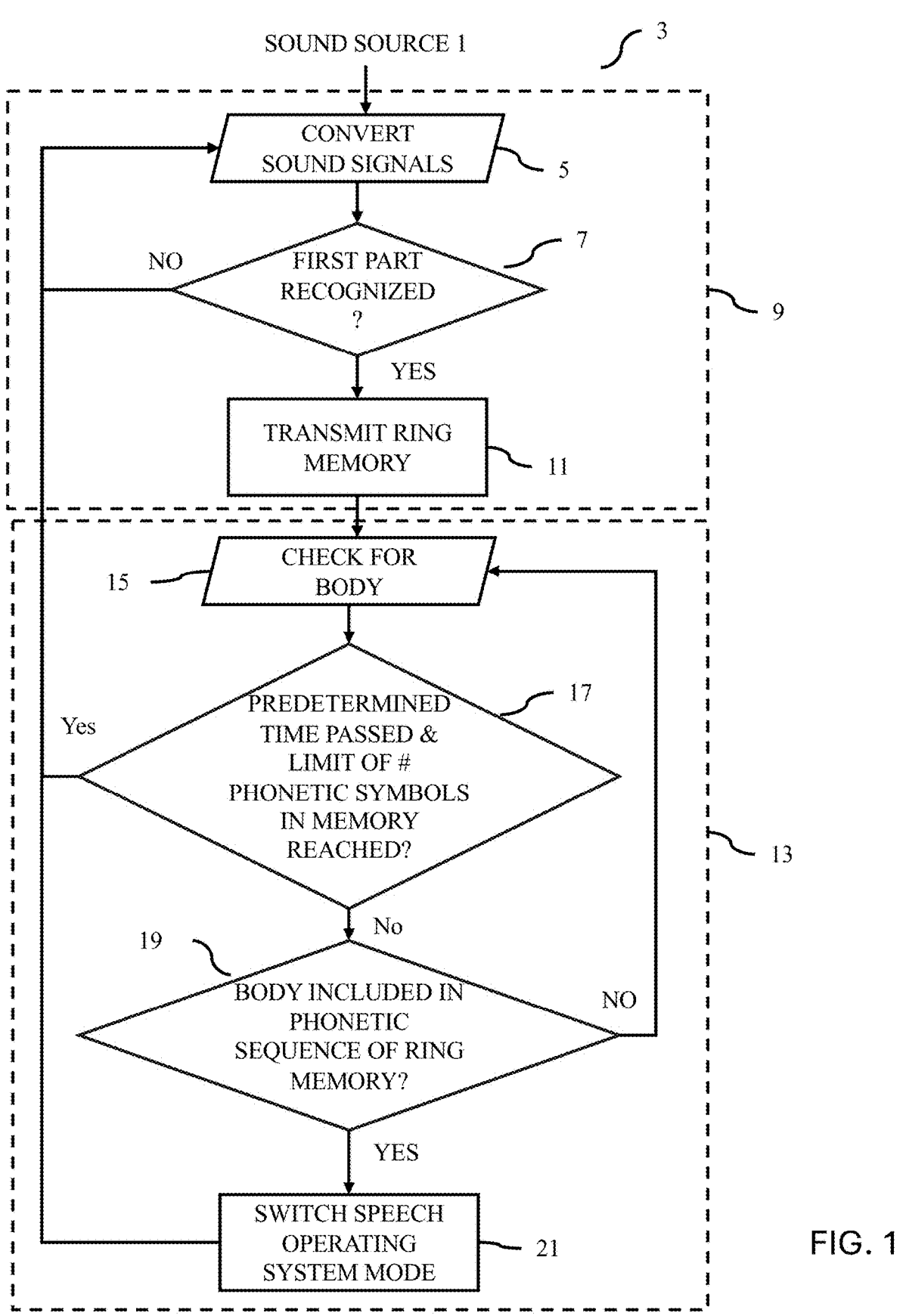

| | | |
|---|---|---|
| 2016/0379635 A1 | 12/2016 | Page |
| 2018/0005633 A1* | 1/2018 | Bocklet .................. G10L 17/02 |
| 2018/0090131 A1* | 3/2018 | Mangalath ........... G10L 15/142 |
| 2018/0324518 A1* | 11/2018 | Dusan ..................... G06F 3/167 |
| 2018/0342237 A1 | 11/2018 | Lee et al. |
| 2019/0043481 A1* | 2/2019 | Georges ................. G10L 15/02 |
| 2019/0043507 A1* | 2/2019 | Huang .................... G10L 17/24 |
| 2019/0221205 A1* | 7/2019 | Czyryba ................ G10L 15/02 |
| 2020/0066271 A1* | 2/2020 | Li ........................... G10L 15/02 |

FOREIGN PATENT DOCUMENTS

| | | |
|---|---|---|
| EP | 3555881 B1 | 4/2020 |
| EP | 3559944 B1 | 9/2020 |
| WO | 0101389 A2 | 1/2001 |

OTHER PUBLICATIONS

Office Action created May 10, 2022 in related/corresponding DE Application No. 10 2021 005 206.4.

\* cited by examiner

METHOD, DEVICE AND COMPUTER PROGRAM PRODUCT FOR CONTROLLING A FUNCTIONAL UNIT OF A VEHICLE

BACKGROUND AND SUMMARY OF THE INVENTION

Exemplary embodiments of the present invention relate to a method and a device for determining a multi-part keyword in a phonetic sequence in a speech utterance of a user.

US 2018/0342237 A1 discloses a method for recognizing a keyword in which a sound sequence is received on a device and a determination of a keyword is carried out. If a keyword can be determined, the phonetic sequence is sent to an external server. In a further step, a piece of text derived from the phonetic sequence by the external server is received, said text being examined for a match with the keyword.

Exemplary embodiments of the present invention are directed to an alternative method and a device for recognizing, in particular, a two-part keyword.

In the method according to the invention, the received phonetic sequence is checked in a first step or a first search phase for the presence of a first part of the keyword. Here, a stream of sounds emanating from a user is converted to a stream of phonetic symbols, i.e., to a phonetic sequence, which is compared to a comparison symbol sequence.

Only if the first part of the keyword is recognized is a check of the phonetic sequence for the presence of a second part of the keyword carried out in a further step, i.e., in a second search phase, and if the second part is also recognized, an activation of the speech operating system is carried out. Accordingly, the recognition of the two-part keyword is implemented in such a way that a first part of the keyword, also known as the differentiator, is initially searched for in the phonetic sequence, and, as soon as this is recognized, only the second part of the keyword, also known as the body, is searched for within limits determined by time and data volumes. An activation of the speech operating system comprises an action; for example, upon recognizing the keyword, a vehicle function is triggered or a dialogue is established in which the user is asked about the entertainment system, what services, functions they want to activate or what information they would like. Thus, the speech control system sending commands to other control systems in order to actuate vehicle functions is also to be understood as implementing an action. The often-erroneous recognition of a keyword by using the keyword or parts of it in a context that differs from the activation intention is reduced by the recognition in two steps. Recognition of the first and second part of the keyword always has a certain error rate. Now, when the two have to be recognized independently of each other, this error rate is much lower than when the keyword is to be recognized as a whole. If the error rate of the first part of the keyword is 0.2 and the error rate of the second part of the keyword is 0.1, for example, then this results in a total error rate of 0.02. In contrast, an error rate for recognizing the keyword as a whole has a much higher error rate of 0.1, for example. In comparison to recognizing the entire keyword, the separate recognition of the parts of the keyword in successive phases thus leads to a lower error rate.

In a modified embodiment, the first and the second part of the keyword is confirmed as recognized as soon as a degree of similarity of the phonetic sequence to a first and second stored comparison symbol sequence lies above a predetermined threshold value. The degree of similarity is determined using methods known from the prior art for the string distance, for example the minimum editing distance.

In a further embodiment, successive identical phonetic symbols of an incoming phonetic sequence are considered to be a single sound. Advantageously, pronunciation durations of different lengths of individual sounds, for example vowels, of a word are thus compensated for and erroneous recognition of the keywords is reduced.

In a further development of the invention, a predetermined time after recognizing the first part of the keyword, the check for the second part is terminated, and the search for the first part is continued. The time is to be measured in such a way that even a very slowly pronounced second part of the keyword is not terminated by the expiry of the predetermined time. Advantageously, if the user pauses after pronouncing the first part of the keyword and later accidentally pronounces a word corresponding to the second part of the keyword, an interpretation as the keyword and an unwanted activation of the speech operation system are avoided. As a result of the termination, a recognition of a newly spoken multi-part keyword is made possible.

According to a further additional or alternative embodiment of the present invention, the incoming phonetic symbols are continuously buffered in a memory, wherein the quantity of the phonetic symbols stored in the buffer is determined as soon as the first part of the keyword is recognized. If the number of stored phonetic symbols reaches a predetermined limit, i.e., the upper limit, for example as soon as the first part of the keyword migrates out of the memory buffer formed as a ring memory, the search for the second part of the keyword is terminated, and a search for the first part is resumed. As soon as a recognition of the first part takes place again, the quantity of the stored phonetic symbols is recounted until the limit is reached.

In doing so, after consciously or even accidentally mentioning the first part of the keyword following further sounds caused by random utterances of the user and noise from the surroundings and stored in the buffer memory, an accidentally mentioned word corresponding to the second part of the keyword being erroneously recognized as belonging to the first part of the keyword and an unwanted activation are advantageously avoided.

In an advantageous development, the search for the second part of the keyword is terminated as soon as the predetermined time has expired and as soon as the number of stored phonetic symbols reaches the limit, depending on which criterion is met first. Using the two termination criteria allows for a degree of freedom to tailor the method to speaker habits, whereby the best possible recognition of the keyword can be achieved.

According to a further embodiment of the present invention, the second part of the keyword is always ascertained following the most recent first part of the keyword. In this second search phase, the second part of the keyword is searched for in the ring memory after the most recent first part of the keyword. The most recent part of the keyword is to be understood as the first part closest in time to the current point in time in the ring memory. If the quantity of phonetic symbols saved in the ring memory reaches the limit and/or if a timer, i.e., a predetermined amount of time, has expired, the check for the first part of the keyword is resumed again. Otherwise, the system remains in the phase searching for the second part of the keyword and starts the search for the second part again after the most recent first part of the keyword in the current ring memory. In other words, if the first part is recognized during the search for the second part, then the timer is reset, and/or the quantity of the phonetic symbols stored in the ring memory is again counted up to the limit and the second part of the keyword is searched for again from this last found first part in a further step. By resetting the timer and/or quantity count of the saved phonetic symbols, a termination of the search for the second part of the keyword is based on the most recent first part, i.e., the probability of a termination when searching for the second part of the keyword during the speech input is clearly reduced.

If, after the search the first part of the keyword is found again first, then the method is repeated, i.e., the time is then reset again, preferably the phonetic symbols to be stored in the ring memory are counted again and the second part of the keyword is searched for in a further step. The method is repeated until either a second part of the keyword following the first part of the keyword is recognized or the timer runs out and/or the number of the phonetic symbols stored in the ring memory reaches the predetermined limit. The first part is searched for in the first search phase; both the first and the second part of the keyword are searched for in the second search phase.

Advantageously, an improved recognition of the multi-part keyword is thus made possible in the event of the user stopping or pausing after mentioning the first part of the keyword and shortly after this repeating the input of the two-part keyword.

According to a further embodiment of the method, the incoming phonetic sequence is smoothed out by placing a continuous viewing window over the sound signals and only sound signals in the viewing window whose number within the viewing window exceeds a predefined frequency threshold being used for the check. Here, the windows are larger than the sound signals ascertained cyclically by a control device. For example, sound signals are ascertained cyclically every 10 ms, i.e., every sound that lasts for a certain period of time is stored in the buffer several times in succession in the ideal case of perfect recognition quality. Here, the viewing window has a value of 50 ms, for example. It is now established whether the signals determined in the observation window are stable or fluctuate greatly. If the signals are stable, i.e., the number of recognized identical sound signals in the observation window exceeds the predetermined frequency threshold, reliable recognition of the sound signals can be assumed. If the frequency threshold is not reached, then the signals in the observation window are discarded due to insufficient detection quality. Advantageously, recognition errors of the first and second part of the keyword are reduced.

The device according to the invention comprises means for receiving a phonetic sequence, wherein the means check the phonetic sequence for the presence of a first part of the keyword and only if the first part is recognized, the means check the phonetic sequence for the presence of a second part of the keyword and only if the second part is recognized, the means activate the speech operating system.

The device according to the invention enables a reliable recognition of a multi-part keyword.

The present invention is explained in more detail below by means of exemplary embodiments with reference to the attached drawings.

BRIEF DESCRIPTION OF THE DRAWING FIGURES

Here are Shown:

FIG. 1 a flowchart of a process sequence, and

Figure 2:
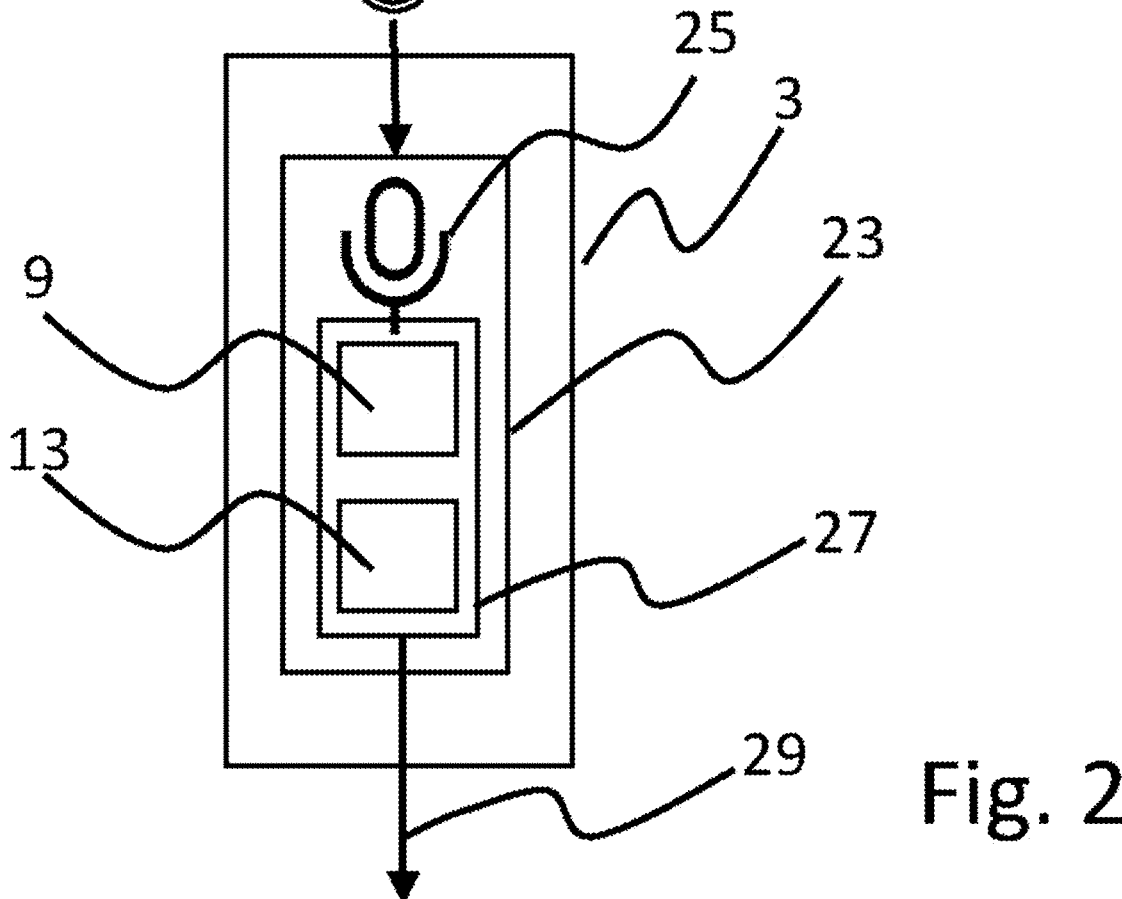

FIG. 2 a speech operating system for carrying out the method according to the invention.

DETAILED DESCRIPTION

The flowchart shown in FIG. 1 shows the method for recognizing a multi-part keyword. The method is carried out in a speech operating system that cyclically analyzes sounds from the surroundings. Upon recognizing a multi-part keyword, the speech operating system changes its state and leaves a wake position and carries out an action. An action can comprise a dialogue with a user or the implementation of a vehicle function such as opening the windows.

A sound sequence comprising sound signals 1 from the surroundings is fed to the speech operating system 3 via a microphone that is not depicted. In a first step 5, sound signals are converted into a stream of symbols as a phonetic sequence and stored in a ring memory. The search for the or parts of the keyword takes place in the ring memory. New phonetic sounds are additionally stored in the ring memory, wherein the same number of phonetic sounds migrate out of the ring memory.

In the following step 7, it is checked as to whether a first part of the keyword, referred to below as the differentiator, is recognized. If no differentiator is recognized, the speech system remains in the wake position. If a differentiator is included in the phonetic sequence, then the first phase 9 is transferred via the step 11 to a second phase 13, in which a second part of the keyword, referred to below as the body, is searched for. In step 11, the ring memory is transmitted and, in step 15, a check is carried out as to whether the phonetic sequence comprises a body.

In step 17, it is checked as to whether, upon recognizing the differentiator, a predetermined amount of time has passed and the number of phonetic symbols stored in the ring memory has reached a predetermined limit. If one or alternatively both of these termination conditions is met, then the second phase 13 is terminated, returned to step 5 and the search for the differentiator is started again. If the conditions are not met and the current check in step 19 shows that no body is included in the phonetic sequence of the ring memory, then it is returned to step 15, from which the current ring memory supplemented by newly accumulated phonetic symbols is checked. If a body is found, then the two-part keyword is considered as recognized, and the speech operating system is switched in step 21 from the wake position into a mode for carrying out an action or into a dialogue mode. Following step 21, the system is again changed into the wake position in step 5.

In a modification of the method described above, the body is searched for in step 19 after the most recent differentiator of the ring memory transmitted in step 11. Accordingly, upon entering the second phase 13, a most recent differentiator is also continuously searched for in the current ring memory in addition to the search for the body, on finding the differentiator the monitoring of the termination conditions is started, i.e., the predetermined time is started again and/or the number of phonetic symbols stored in the ring memory is counted up again. After restarting the termination condition, only the body is searched for again in a further step. If no body is found after the most recent differentiator, then in step 5 phase 9 is switched back into after the predetermined period of time has expired and/or as soon as the number of the stored phonetic symbols reaches the limit, in each case with reference to the point in time of recognizing the most recent differentiator. Thus, it is achieved that, for example with a keyword "hello car", when a user stops after "hello ... " and then continues after a pause with "hello car", a time limit or a quantity limit of the saved sounds in the buffer memory is not referenced to the first, but rather to the second hello, such that a termination probability with the input due to the pause is reduced.

FIG. 2 shows a speech operating system 3, which comprises a means 23 for receiving and for evaluating sound sequences 24. The means 23 includes, for example, a microphone 25 and a computing unit 27 connected to the microphone 25 for processing the transmitted signals. Furthermore, the computing unit 27 is set up to transmit signals 29 to other control devices based on the evaluation or to establish a dialogue with a user. The signal, as in the description of FIG. 1, is implemented in the computing unit of the means 23 in phase 9 and then processed in steps in phase 13.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:

receiving, by a microphone of a vehicle, sound signals;

converting, by a speech operating system of the vehicle in a first speech recognition phase, the received sound signals into a phonetic sequence in a stream of symbols;

storing the stream of symbols in a ring memory;

determining, by the speech operating system, that the stream of symbols stored in the ring memory includes a first part of a multi-part keyword;

initiating, only when it is determined the steam of symbols stored in the ring memory include the first part of the multi-part keyword, a second speech recognition phase comprising checking the stream of symbols stored in the ring memory for presence of a second part of the multi-part keyword until an earliest of a first condition is satisfied or a second and third condition are satisfied, wherein the first condition is recognizing the second part of the multi-part keyword, the second condition is expiration of a predetermined amount of time since the determination that the stream of symbols stored in the ring memory include the first part of the multi-part keyword and the third condition is a number of phonetic symbols of the stream of symbols reaches a predetermined limit;

determining, by the speech operating system before the second and third conditions are satisfied, that the stream of symbols stored in the ring memory include the second part of the multi-party keyword; and sending, by the speech operating system responsive to the determining the stream of symbols stored in the ring memory include the second part of the multi-part keyword, a command to at least one other control system of the vehicle to actuate at least one function of the vehicle.

2. The method of claim 1, wherein the determination that the stream of symbols stored in the ring memory include first and the second part of the multi-part keyword is confirmed as recognized as soon as a degree of similarity of a phonetic sequence with a first and second saved comparison symbol sequence lies above a predetermined threshold value.

3. The method of claim 1, wherein successive identical phonetic symbols in the phonetic sequence are considered as a single phonetic symbol.

4. The method of claim 1, wherein the second part of the multi-part keyword is determined following a most recent first part of the multi-part keyword.

5. The method of claim 1, wherein the received the phonetic sequence is smoothed out by placing a continuous viewing window above the phonetic sequence and only phonetic symbols in the viewing window are used for the determining that the stream of symbols include the first and second parts of the multi-part keyword, wherein a number of the phonetic symbols in the viewing window exceeds a predetermined frequency threshold within the viewing window.

6. A method comprising:

receiving, by a microphone of a vehicle, sound signals;

initiating a first speech recognition phase comprising converting, by a speech operating system of the vehicle in a first speech recognition phase, the received sound signals into a phonetic sequence in a stream of symbols;

storing the stream of symbols in a ring memory; and determining, by the speech operating system, that the stream of symbols stored in the ring memory includes a first part of a multi-part keyword;

initiating, only when it is determined the steam of symbols stored in the ring memory include the first part of the multi-part keyword, a second speech recognition phase, wherein the second speech recognition phase comprises checking the stream of symbols stored in the ring memory for presence of a second part of the multi-part keyword until an earliest of a first condition is satisfied or a second and third condition are satisfied, wherein the first condition is recognizing the second part of the multi-part keyword, the second condition is expiration of a predetermined amount of time since the determination that the stream of symbols stored in the ring memory include the first part of the multi-part keyword and the third condition is a number of phonetic symbols of the stream of symbols reaches a predetermined limit;

determining, by the speech operating system, that the second and third conditions are satisfied and the second part of the multi-party keyword is not in the stream of symbols stored in the ring memory and in response returning to the first speech recognition phase until it is determined the first part of the multi-part keyword is in the stream of symbols stored in the ring memory and the second part of the multi-part keyword is in the stream of symbols before the second and third conditions are satisfied; and sending, by the speech operating system responsive to the determining the stream of symbols stored in the ring memory include the second part of the multi-part keyword, a command to at least one other control system of the vehicle to actuate at least one function of the vehicle.

7. The method of claim 6, wherein the determination that the stream of symbols stored in the ring memory include first and the second part of the multi-part keyword is confirmed as recognized as soon as a degree of similarity of a phonetic sequence with a first and second saved comparison symbol sequence lies above a predetermined threshold value.

8. The method of claim 6, wherein successive identical phonetic symbols in the phonetic sequence are considered as a single phonetic symbol.

9. The method of claim 6, wherein the second part of the multi-part keyword is determined following a most recent first part of the multi-part keyword.

10. The method of claim 6, wherein the received the phonetic sequence is smoothed out by placing a continuous viewing window above the phonetic sequence and only phonetic symbols in the viewing window are used for the determining that the stream of symbols include the first and second parts of the multi-part keyword, wherein a number of the phonetic symbols in the viewing window exceeds a predetermined frequency threshold within the viewing window.

11. The method of claim 6, further comprising:
determining, during the second speech recognition phase, that the stream of symbols stored in the ring memory include the first part of the multi-part keyword; and
restarting, the second speech recognition phase using the first part of the multi-part keyword, to determine whether the stream of symbols includes the second part of the multi-party keyword, and resetting the predetermined amount of time and the predetermined limit.

* * * * *